United States Patent
Gao et al.

(10) Patent No.: US 9,158,802 B2
(45) Date of Patent: Oct. 13, 2015

(54) DATABASE PARTITION MANAGEMENT

(71) Applicant: Teradata US, Inc., Dayton, OH (US)

(72) Inventors: Like Gao, San Diego, CA (US); Yu Long, San Diego, CA (US); Congnan Luo, San Diego, CA (US); Judy Wu, San Diego, CA (US); Michael Leon Reed, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 0 days.

(21) Appl. No.: 14/041,545

(22) Filed: Sep. 30, 2013

(65) Prior Publication Data

US 2014/0032614 A1 Jan. 30, 2014

Related U.S. Application Data

(62) Division of application No. 12/968,736, filed on Dec. 15, 2010, now Pat. No. 8,560,584.

(51) Int. Cl.
G06F 17/30 (2006.01)

(52) U.S. Cl.
CPC .... *G06F 17/30339* (2013.01); *G06F 17/30306* (2013.01)

(58) Field of Classification Search
USPC ......... 707/687, 692, 703, 705, 713, 722, 736, 707/758
See application file for complete search history.

(56) References Cited

U.S. PATENT DOCUMENTS

| 8,055,848 | B2* | 11/2011 | Aciicmez et al. | 711/125 |
|---|---|---|---|---|
| 8,560,584 | B2 | 10/2013 | Gao et al. | |
| 2004/0199473 | A1* | 10/2004 | Birkestrand et al. | 705/64 |
| 2006/0075207 | A1* | 4/2006 | Togawa et al. | 711/202 |
| 2006/0242442 | A1* | 10/2006 | Armstrong et al. | 713/400 |
| 2008/0098045 | A1 | 4/2008 | Radhakrishnan et al. | |
| 2008/0282057 | A1 | 11/2008 | Layden et al. | |
| 2011/0320419 | A1* | 12/2011 | Johnston et al. | 707/703 |

OTHER PUBLICATIONS

"U.S. Appl. No. 12/968,736, Non Final Office Action mailed Feb. 8, 2013", 9 pgs.
"U.S. Appl. No. 12/968,736, Response filed May 8, 2013 to Non Final Office Action mailed Feb. 8, 2013", 8 pgs.
"Partitioning Enhancements in Oracle Database 11g Release 1", [Online]. Retrieved from the Internet: <URL: http://wwvv.oracle-base.com/articles/11g/PartitioningEnhancements_11gR1.php>, (Accessed Oct. 8, 2010), 10 pgs.
"U.S. Appl. No. 12/968,736, Notice of Allowance mailed Jun. 14, 2013", 6 pgs.

* cited by examiner

*Primary Examiner* — Sana Al Hashemi
(74) *Attorney, Agent, or Firm* — Schwegman Lundberg & Woessner, P.A.

(57) ABSTRACT

Apparatus, systems, and methods may operate to receive a request to move at least a portion of a database table stored on a tangible medium from a current partition to a history partition, wherein the database table is partitioned into physical partitions according to a selected mapping update frequency. In response to receiving the request, activities may include modifying a logical partitioning of the database table by updating a mapping of the physical partitions to logical partitions. Other apparatus, systems, and methods are disclosed.

20 Claims, 13 Drawing Sheets

| Logical Partition Number | Condition |
|---|---|
| 1 | END(TTCOL)>= CURRENT_TIMESTAMP |
| 2 | NO CASE |

| Physical Partition Number | Condition | Logical Partition Number |
|---|---|---|
| 1 | END(TTCOL)>= '2009-09-07 16:00:00.000000' && END(TTCOL)< '2009-09-07 16:00:00.000000' + INTERVAL '1' DAY | 1 |
| 2 | END(TTCOL)>= '2009-09-07 16:00:00.000000' + INTERVAL '1' DAY && END(TTCOL)< '2009-09-07 16:00:00.000000' + INTERVAL '2' DAY | 1 |
| 3 | END(TTCOL)>= '2009-09-07 16:00:00.000000' + INTERVAL '2' DAY && END(TTCOL)< '2009-09-07 16:00:00.000000' + INTERVAL '3' DAY | 1 |
| 4 | END(TTCOL)>= '2009-09-07 16:00:00.000000' + INTERVAL '3' DAY && END(TTCOL)< '2009-09-07 16:00:00.000000' + INTERVAL '4' DAY | 1 |
| 5 | END(TTCOL)>= '2009-09-07 16:00:00.000000' + INTERVAL '4' DAY | 1 |

| Physical Partition Number | Condition | Logical Partition Number |
|---|---|---|
| 1 | END(TTCOL)>= '2009-09-07 16:00:00.000000' && END(TTCOL)< '2009-09-07 16:00:00.000000' – INTERVAL '1' DAY | 2 → change to from 1 to 2 |
| 2 | END(TTCOL)>= '2009-09-07 16:00:00.000000' + INTERVAL '1' DAY && END(TTCOL)< '2009-09-07 16:00:00.000000' INTERVAL '2' DAY | 1 → don't change partition. |
| 3 | END(TTCOL)>= '2009-09-07 16:00:00.000000' + INTERVAL '2' DAY && END(TTCOL)< '2009-09-07 16:00:00.000000' – INTERVAL '3' DAY | 1 |
| 4 | END(TTCOL)>= '2009-09-07 16:00:00.000000' + INTERVAL '3' DAY && END(TTCOL)< '2009-09-07 16:00:00.000000' – INTERVAL '4' DAY | 1 |
| 5 | END(TTCOL)> '2009-09-07 16:00:00.000000' + INTERVAL '4' DAY | 1 |

| Physical Partition Number | Condition | Logical Partition Number | |
|---|---|---|---|
| 1 | END(TTCOL)>= '2009-09-7 16:00:00.000000' && END(TTCOL)< '2009-09-12 17:00:00.000000' | 2 | 442 |
| 2 | END(TTCOL)>= '2009-09-12 17:00:00.000000' && END(TTCOL)< '2009-09-12 17:00:00.000000' + INTERVAL '1' DAY | 1 | |
| 3 | END(TTCOL)>= '2009-09-12 17:00:00.000000' + INTERVAL '1' DAY && END(TTCOL)< '2009-09-12 17:00:00.000000' + INTERVAL '2' DAY | 1 | 444 |
| 4 | END(TTCOL)>= '2009-09-12 17:00:00.000000' + INTERVAL '2' DAY && END(TTCOL)< '2009-09-12 17:00:00.000000' + INTERVAL '3' DAY | 1 | |
| 5 | END(TTCOL)>= '2009-09-12 17:00:00.000000' + INTERVAL '3' DAY | 1 | |

*FIG. 4*

| Logical Partition Number | Condition |
|---|---|
| 1 | END(VTCOL)>= CURRENT_DATE AND END(TTCOL)>= CURRENT_TIMESTAMP |
| 2 | END(VTCOL)< CURRENT_DATE AND END(TTCOL)>= CURRENT_TIMESTAMP |
| 3 | END(TTCOL)< CURRENT_TIMESTAMP |

| Level 1 Physical Partition Number (by TransactionTime) | Level 2 Physical Partition Number (by ValidTime) | Condition | Logical Partition Number |
|---|---|---|---|
| 1 | 1 | END(TTCOL)>= '2009-09-07 16:00:00.000000' && END(TTCOL)< '2009-09-07 16:00:00.000000' − INTERVAL '1' DAY && END(VTCOL)>= '2009-09-07' &&END(VTCOL)< '2009-09-07'+ INTERVAL '1' DAY | 1 |
| | 2 | END(TTCOL)>= '2009-09-07 16:00:00.000000' && END(TTCOL)< '2009-09-07 16:00:00.000000' − INTERVAL '1' DAY && END(VTCOL)>= '2009-09-07' + INTERVAL '1' DAY &&END(VTCOL)< '2009-09-07'+ INTERVAL '2' DAY | 1 |
| | 3 | END(TTCOL)>= '2009-09-07 16:00:00.000000' && END(TTCOL)< '2009-09-07 16:00:00.000000' − INTERVAL '1' DAY && END(VTCOL)>= '2009-09-07' + INTERVAL '2' DAY | 1 |
| 2 | 1 | END(TTCOL)>= '2009-09-07 16:00:00.000000' + INTERVAL '1' DAY && END(TTCOL)< '2009-09-07 16:00:00.000000' + INTERVAL '2' DAY && END(VTCOL)>= '2009-09-07' && END(VTCOL)< '2009-09-07'− INTERVAL '1' DAY | 1 |
| | 2 | END(TTCOL)>= '2009-09-07 16:00:00.000000' + INTERVAL '1' DAY && END(TTCOL)< '2009-09-07 16:00:00.000000' + INTERVAL '2' DAY && END(VTCOL)>= '2009-09-07' + INTERVAL '1' DAY &&END(VTCOL)< '2009-09-07'+ INTERVAL '2' DAY | 1 |

*FIG. 6A*

| 3 | 1 | END(TTCOL)>= '2009-09-07 16:00:00.000000' + INTERVAL '2' DAY && END(VTCOL)>= '2009-09-07' &&END(VTCOL)< '2009-09-07'+ INTERVAL '1' DAY | 1 |
|---|---|---|---|
|   | 2 | END(TTCOL)>= '2009-09-07 16:00:00.000000' + INTERVAL '2' DAY && END(VTCOL)>= '2009-09-07' + INTERVAL '1' DAY && END(VTCOL)< '2009-09-07'+ INTERVAL '2' DAY | 1 |
|   | 3 | END(TTCOL)>= '2009-09-07 16:00:00.000000' + INTERVAL '2' DAY && END(VTCOL)>= '2009-09-07' + INTERVAL '2' DAY | 1 |

| Level 1 Physical Partition Number (by TransactionTime) | Level 2 Physical Partition Number (by ValidTime) | Condition | Logical Partition Number |
|---|---|---|---|
| 1 | 1 | END(TTCOL)>= '2009-09-07 16:00:00.000000' && END(TTCOL)< '2009-09-07 16:00:00.000000' + INTERVAL '1' DAY && END(VTCOL)>= '2009-09-07' &&END(VTCOL)< '2009-09-07'+ INTERVAL '1' DAY | 3➔ change from 1 to 3 |
| | 2 | END(TTCOL)>= '2009-09-07 16:00:00.000000' && END(TTCOL)< '2009-09-07 16:00:00.000000' + INTERVAL '1' DAY && END(VTCOL)>= '2009-09-07' + INTERVAL '1' DAY &&END(VTCOL)< '2009-09-07'+ INTERVAL '2' DAY | 3➔ change from 1 to 3 |
| | 3 | END(TTCOL)>= '2009-09-07 16:00:00.000000' && END(TTCOL)< '2009-09-07 16:00:00.000000' + INTERVAL '1' DAY && END(VTCOL)>= '2009-09-07' + INTERVAL '2' DAY | 3 ➔ change from 1 to 3 |
| 2 | 1 | END(TTCOL)>= '2009-09-07 16:00:00.000000' + INTERVAL '1' DAY && END(TTCOL)< '2009-09-07 16:00:00.000000' + INTERVAL '2' DAY && END(VTCOL)>= '2009-09-07' && END(VTCOL)< '2009-09-07'+ INTERVAL '1' DAY | 2➔ change from 1 to 2 |
| | 2 | END(TTCOL)>= '2009-09-07 16:00:00.000000' + INTERVAL '1' DAY && END(TTCOL)< '2009- | 2➔ change from 1 to 2 |

*FIG. 7A*

| Level 1 Physical Partition Number (by TransactionTime) | Level 2 Physical Partition Number (by ValidTime) | Condition | Logical Partition Number |
|---|---|---|---|
| 1 | 1 | END(TTCOL)>= '2009-09-07 16:00:00.000000' && END(TTCOL)< '2009-09-12 16:00:00.000000' && END(VTCOL)>= '2009-09-07' &&END(VTCOL)< '2009-09-07'+ INTERVAL '1' DAY | 3 ➔combine all closed rows in old partition 1.1, 2.1, 3.1* |
| | 2 | END(TTCOL)>= '2009-09-07 16:00:00.000000' && END(TTCOL)< '2009-09-12 16:00:00.000000' && END(VTCOL)>= '2009-09-07' + INTERVAL '1' DAY && END(VTCOL)< '2009-09-07'+ INTERVAL '2' DAY | 3➔ combine all closed rows in old partition 1.2, 2.2, 3.2* |
| | 3 | END(TTCOL)>= '2009-09-07 16:00:00.000000' && END(TTCOL)< '2009-09-12 16:00:00.000000' && END(VTCOL)>= '2009-09-07' + INTERVAL '2' DAY | 3➔ combine all closed row in old partition 1.3, 2.3, 3.3* |
| 2➔create a new partition | 1➔create a new sub-partition | END(TTCOL)>= '2009-09-12 16:00:00.000000' && END(TTCOL)< '2009-09-12 16:00:00.000000' + INTERVAL '1' DAY && END(VTCOL)>= '2009-09-07' &&END(VTCOL)< '2009-09-12' | 2 ➔ add mapping for the new partition |

*m.n means partition m, sub-partition n

FIG. 8A

| | | | |
|---|---|---|---|
| 2→create a new partition | 2→create a new sub-partition | END(TTCOL)>= '2009-09-12 16:00:00.000000' && END(TTCOL)< '2009-09-12 16:00:00.000000' + INTERVAL '1' DAY && END(VTCOL)>= '2009-09-12' &&END(VTCOL)< '2009-09-12'+ INTERVAL '1' DAY | 1 →add mapping for the new partition |
| | 3→create a new sub-partition | END(TTCOL)>= '2009-09-12 16:00:00.000000' && END(TTCOL)< '2009-09-12 16:00:00.000000' + INTERVAL '1' DAY && END(VTCOL)>= '2009-09-12' + INTERVAL '1' DAY | 1→ add mapping for the new partition |
| 3 | 1 | END(TTCOL)>= '2009-09-12 16:00:00.000000' + INTERVAL '1' DAY && END(VTCOL)>= '2009-09-07' &&END(VTCOL)< '2009-09-12' | 2 |
| | 2 | END(TTCOL)>= '2009-09-12 16:00:00.000000' + INTERVAL '1' DAY && END(VTCOL)>= '2009-09-12' && END(VTCOL)< '2009-09-12'+ INTERVAL '1' DAY | 1→change the mapping to 1 |
| | 3 | END(TTCOL)>= '2009-09-12 16:00:00.000000' + INTERVAL '1' DAY && END(VTCOL)>= '2009-09-12' + INTERVAL '1' DAY | 1 |

*m.n means partition m, sub-partition n

FIG. 8B

DATABASE PARTITION MANAGEMENT

CLAIM OF PRIORITY

This application is a divisional of and claims the benefit of priority under 35 U.S.C. 120 to U.S. patent application Ser. No. 12/968,736, filed on Dec. 15, 2010, which is hereby incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example code, screen shots, and images described below, and in any drawings appended hereto: Copyright 2010 Teradata, Inc. of Miamisburg, Ohio—All Rights Reserved.

BACKGROUND

It is not uncommon to see the amount of data associated with a business venture grow at an exponential pace. The growing amount of data is often stored in a database to enable convenient management. In some cases, temporal semantics are supported so that the data can be stored and manipulated along with associated valid time (VT) and transaction time (TT) information, perhaps as part of a relational database. Thus, over time, the amount of stored data may greatly increase, along with the overall query response time of the data management system.

To increase efficiency, as the data ages, non-current data may be moved within the system, perhaps using periodic requests that transition older database rows from the current partition to a history partition. This type of physical data movement can consume system resources, and further slow down the system query response time.

BRIEF DESCRIPTION OF THE DRAWINGS

FIG. 1 illustrates logical partitions for a transaction table created according to various embodiments of the invention.

FIG. 2 illustrates physical to logical partition mapping for a transaction table created according to various embodiments of the invention.

FIG. 3 illustrates updated physical to logical partition mapping for a transaction table according to various embodiments of the invention.

FIG. 4 illustrates physical partition combination and updated physical to logical partition mapping for a transaction table according to various embodiments of the invention.

FIG. 5 illustrates logical partitions for a bi-temporal table created according to various embodiments of the invention.

FIGS. 6A, 6B illustrate physical to logical partition mapping for a bi-temporal table created according to various embodiments of the invention.

FIGS. 7A, 7B illustrate updated physical to logical partition mapping for a bi-temporal table according to various embodiments of the invention.

FIGS. 8A, 8B illustrate physical partition combination and updated physical to logical partition mapping for a bi-temporal table according to various embodiments of the invention.

DETAILED DESCRIPTION

Figure 6B:
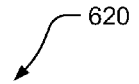

When the database update frequency is high, the amount of history data in the current partition can increase relatively quickly. This may result in degraded query performance, perhaps indicated by an increasing amount of time used to process SQL "CURRENT" query statements.

To increase operational efficiency, the Database Administrator may thus periodically submit requests to transition older rows from the current partition to a history partition. This is often referred to by those of ordinary skill in the art as a "lazy move" operation. For example, when structured query language (SQL) is used, this can often be accomplished via the "ALTER TABLE . . . TO CURRENT" SQL statement.

To maintain operational efficiency, history data is moved out of the current partition as often as possible. Practically, such activity is reserved for non-peak business hours, or backend operations. This is because conventional lazy move operations are implemented by physically removing older data from the current partition, and then inserting the removed data into the history partition. Due to the relatively high input/output (I/O) resource cost, this activity can greatly affect overall system operations.

To address some of these challenges, among others, many embodiments operate to make use of virtual partitioning: mapping from a physical partition (the actual partition used to store data on the disk) to a logical partition (defined by the partition expression in a SQL CREATE TABLE statement, for example). When accomplished as described herein, most lazy move operations involve only a change in mapping from physical partitions to logical partitions, without moving data. This type of operation can greatly reduce the I/O cost of a lazy move operation.

Physical partitions are the actual partitions used to store data on the disk. Logical partitions are defined by the user—they can be apportioned in various ways, as either current or history partitions. In many cases, some logical partitions belong to a history partition, and the rest belong to the current partition. Sometimes there is historical data in the current partition. The logical partitions may thus be apportioned between a "current partition" and a "history partition", which can be defined in the partition expression clause in a SQL CREATE TABLE statement, for example.

To establish some concrete examples of logical partitioning, it may be noted that a Valid Time (VT) database table can have rows that are either valid (current or future) or no longer valid. Therefore, it can be useful to logically partition a VT table into two sets: a set of valid rows (called the current partition) and a set of no-longer-valid rows (called the history partition).

Similarly, for a Transaction Time (TT) table, rows may be either open or closed. Therefore, it can be useful to logically partition a TT table into two sets: a set of open rows (called the current partition) and a set of closed rows (called the history partition).

Finally, for a bi-temporal table, it can be useful to logically partition the table into three sets: a set of valid (current and future) rows that are open (called the current partition), a set of no-longer-valid and open rows (called the TTOpenVTHistory partition in some embodiments), and a set of closed rows (called the TTHistory partition in some embodiments).

In accordance with these principles, two examples of database partition management are provided as example embodiments. The first, shown in FIGS. 1-4, makes use of a TT table. The second, shown in FIGS. 5-8, makes use of a bi-temporal table.

Consider now the first example, which makes use of a TT table. A set of SQL statements may be used to create and partition the TT table "Orders" as follows:

```
CREATE MULTISET TABLE Orders, NO FALLBACK
(
Order_number INTEGER,
    TTCOL PERIOD(TIMESTAMP(6) WITH TIME ZONE) NOT
    NULL AS TRANSACTIONTIME)
PRIMARY INDEX ( Order_number )
PARTITION BY CASE_N (END(TTCOL)>=
    CURRENT_TIMESTAMP, NO CASE);
```

As a first activity, and part of the table creation, one chooses the number of physical partitions, for example, five in this case. Any number of partitions can be chosen. In some instances, a useful and approximate maximum number may be calculated as:

Number of physical partitions≈(Expected maximum lifetime of a database table)/(Frequency of lazy move requests).

For example, if a database table was created on 2000-01-01 and is expected to be used for 30 years (until 2030-01-01), with a frequency of lazy move requests being about once per week, then the number of physical partitions might be chosen as 30*52/1=1560. When the total number of physical partitions is chosen to be equal to or greater than this number of physical partitions, actual data movement may be almost entirely avoided in various embodiments.

If the total number of physical partitions is less than the calculated number of physical partitions, the number chosen will determine how frequently physical data movement occurs. The larger the number of physical partitions, the less frequently physical data movement occurs (such as when remapping the logical partitions alone does not serve to accommodate a lazy move request).

As a second activity, the TT table may be partitioned by day, month, year, or any other chosen interval, usually depending on the business data update frequency. In this example, partition "by day" may be assumed.

Dirty data is a phrase that refers to misleading or incorrect data, such as outdated data that has been collected as part of a database. For the purposes of this document, "dirty data" means history data that remains in current partitions. As will be seen later (refer to the fifth activity for the TT table, below), data dirtiness in a partition reduces the query performance in current time. Data dirtiness is often impacted by two factors, approximately as follows:

Data dirtiness≈(Interval of partitioning)*(Business data update frequency per interval).

Thus, the amount of dirtiness in the database is proportional to the partitioning time interval and the data update frequency per partitioning time interval. The larger the partition interval is, the dirtier the data will be. The more frequently the business data is updated, the dirtier the data will be. Therefore, to control the level of data dirtiness, the partition interval should be reduced in size when the business data is updated more frequently.

As a third activity, a physical partition number is assigned to each TT table interval until numbers have been assigned to all of the physical partitions. The numbers can be assigned to the physical partitions as ordered integers, with the least-valued number being assigned to the physical partition that will hold the oldest data, and the greatest-valued number being assigned to the physical partition that will hold the most recent data. This latter partition can thus be interchangeably referred to as the physical partition assigned to receive the most recent data, as well as the physical partition having the highest assigned number in the embodiments described below.

As a fourth activity, virtual partitioning is put in place. This occurs by mapping the physical partitions to the logical partitions.

FIG. 1 illustrates logical partitions 110 for a transaction table created according to various embodiments of the invention. In this case, the transaction table "Orders" (created by the SQL statements given previously) has two logical partitions 110.

FIG. 2 illustrates physical to logical partition mapping 220 for a transaction table created according to various embodiments of the invention. For example, suppose the table "Orders" was created on date 2009-09-07, at time 16:00:00.000000. At that time, the virtual partition might be as shown in FIG. 2.

As part of a fifth activity, FIG. 3 illustrates updated physical to logical partition mapping 330 for a transaction table according to various embodiments of the invention. For example, if a lazy move request was issued on date 2009-09-09, at time 09:53:00.000000, only the virtual partitioning of the table would be changed. Physical data movement would not be required.

Thus, the mapping of physical partition 1 is updated from logical partition 1 to logical partition 2. For physical partition 2, even though part of the data in this partition should be mapped to logical partition 2, the mapping is not updated until all of the data within the partition is dirty (i.e., all of the data in the physical partition 2 has become history rows). Therefore, the physical partition 2 remains mapped to logical partition 1, even though it already contains some history rows. Thus, the virtual partitioning 330 of the transaction table after a lazy move operation requested on date 2009-09-09, at time 09:53:00.000000 might be as shown in FIG. 3.

The penalty for refraining from remapping physical partition 2 in this case is a small one, limited by the granularity of the solution. By choosing an appropriate time interval for the partition granularity, the data dirtiness (e.g., the percentage of history data remaining inside a CURRENT partition) within a physical partition is controlled, being limited to some desired amount.

FIG. 4 illustrates physical partition combination and updated physical to logical partition mapping 440 for a transaction table according to various embodiments of the invention. Thus, when it is determined that the physical partition having the highest assigned number in the database contains at least one history row, the next lazy move operation can be used to physically move data. This condition may be more efficient to test in some embodiments, because the data in a single physical partition (i.e., the physical partition having the highest assigned number, or assigned to receive the most recent data, as described below) can be checked, rather than checking all the other partitions.

During the lazy move operation, all writing to the table is blocked, while reading is allowed. Because of these circumstances, various embodiments that usually operate without physical data movement provide relatively rapid response. The exception is on the occasion where physical data movement occurs. Then the lazy move operation will take longer, and the blackout time for the user updates (i.e., the time when writing is blocked) is longer.

To accomplish this sixth activity, the database system can operate to combine all of the history data in the physical partitions numbered 1-5 (see FIG. 3) into a combined physical partition 442. In this case, all of the data in physical partitions 2-4 are moved into physical partition 1, and the data in physical partition 1 don't need to move. If part of the data in partition 5 has become history data, this history data is also moved to physical partition 1. The rest of partition 5 is current data, and remains in partition 5.

Next, three new partitions are created, and numbered 2-4. The condition associated with physical partitions 1-4 is updated accordingly. The condition of partition 5 is updated as well and all the current data remains in partition 5.

The virtual partitioning is updated accordingly. That is, the new (combined) physical partition 442 (physical partition 1) is mapped to logical partition 2. The remaining physical partitions 444 are all mapped to logical partition 1. For example, if a lazy move request was issued on date 2009-09-12, at time 17:00:00.000000, the result of the mapping 440 after the operation might be as shown in FIG. 4.

Thus, in FIG. 3, it can be seen that when a lazy move request is issued, only the mapping from physical partitions to logical partitions is changed, without underlying physical data movement. When SQL CURRENT query statements are used afterward, performance improves because data dirtiness is decreased, reducing the number of unnecessary I/O operations that can be introduced by reading additional history data.

As a matter of contrast, when the situation illustrated in FIG. 4 appears (i.e., a lazy move request is received when the physical partition having the highest assigned number contains at least one history row), history data is physically moved from physical partitions 2-5, into physical partition 1. Since most of time the data move can be accomplished for one partition as a whole (such as partition 2-4), block-level optimization may be employed in some embodiments.

Thus, in various embodiments, the overhead of lazy move operations with respect to physical data movement is avoided for some period of time—until the physical partition having the highest assigned number (e.g., the physical partition assigned to receive the most recent data) contains at least one history row. Then physical movement of history data occurs, and performance is temporarily reduced. Afterward, improved performance is once again achieved. Other embodiments may be realized.

Consider now the second example, which makes use of a bi-temporal table. This example illustrates that various embodiments can employ partitioning along both TT and VT dimensions using the techniques described previously. In some embodiments, a two-level physical partition can be built with TT as the outer level, and VT as the inner level, using a multi-level PPI.

Other physical partitions may also be used. For example, a two-level physical partition with VT at the first level, and TT at the second level. Even a flattened, one-level physical partition is possible. This might occur, for example, when a table is defined with logical partitions at two levels, and the storage system uses a single level of physical partitions.

In the second example, a two level physical partition model is constructed for a bi-temporal table "BiOrders", perhaps created using the following SQL statements:

```
CREATE MULTISET TABLE BiOrders, NO FALLBACK
    (
    Order_number INTEGER,
        VTCOL PERIOD(DATE) AS VALIDTIME NOT NULL,
        TTCOL PERIOD(TIMESTAMP(6) WITH TIME ZONE) NOT
        NULL AS TRANSACTIONTIME)
    PRIMARY INDEX ( Order_number )
    PARTITION BY CASE_N(
        END(VTCOL)>= CURRENT_DATE AND END(TTCOL)>=
            CURRENT_TIMESTAMP,
        END(VTCOL)< CURRENT_DATE AND END(TTCOL)>=
            CURRENT_TIMESTAMP,
        END(TTCOL)< CURRENT_TIMESTAMP);
```

In a first activity, the desired number of physical partitions is selected for both the TT dimension, and the VT dimension. For simplicity, assume each is separated into three physical partitions.

As a second activity, on a first level, the TT dimension is partitioned by day, month, year, or any other useful interval, depending on the business data update frequency. In this case, as before, let the partition interval "by day" be chosen. On a second level, the VT dimension can also be partitioned as desired. For simplicity, let the partition interval "by day" be chosen for this dimension as well.

As a third activity, a physical partition number is assigned to each TT interval until the maximum number of partitions is reached. This is also done for the second level—in this case, the VT dimension.

As a fourth activity, a map is built, to map from the logical partition number(s), to the physical partition numbers.

FIG. 5 illustrates logical partitions 510 for a bi-temporal table created according to various embodiments of the invention. In this case, the bi-temporal table "BiOrders" (created using the SQL statements given previously) has three logical partitions 510.

FIGS. 6A, 6B illustrate physical to logical partition mapping 620 for a bi-temporal table created according to various embodiments of the invention. For example, suppose the table "BiOrders" was created on date 2009-09-07, at time 16:00:00.000000. Assuming no history data exists before the table creation time, the virtual partition mapping 620 at that time might be as shown in FIG. 6.

Figure 7B:
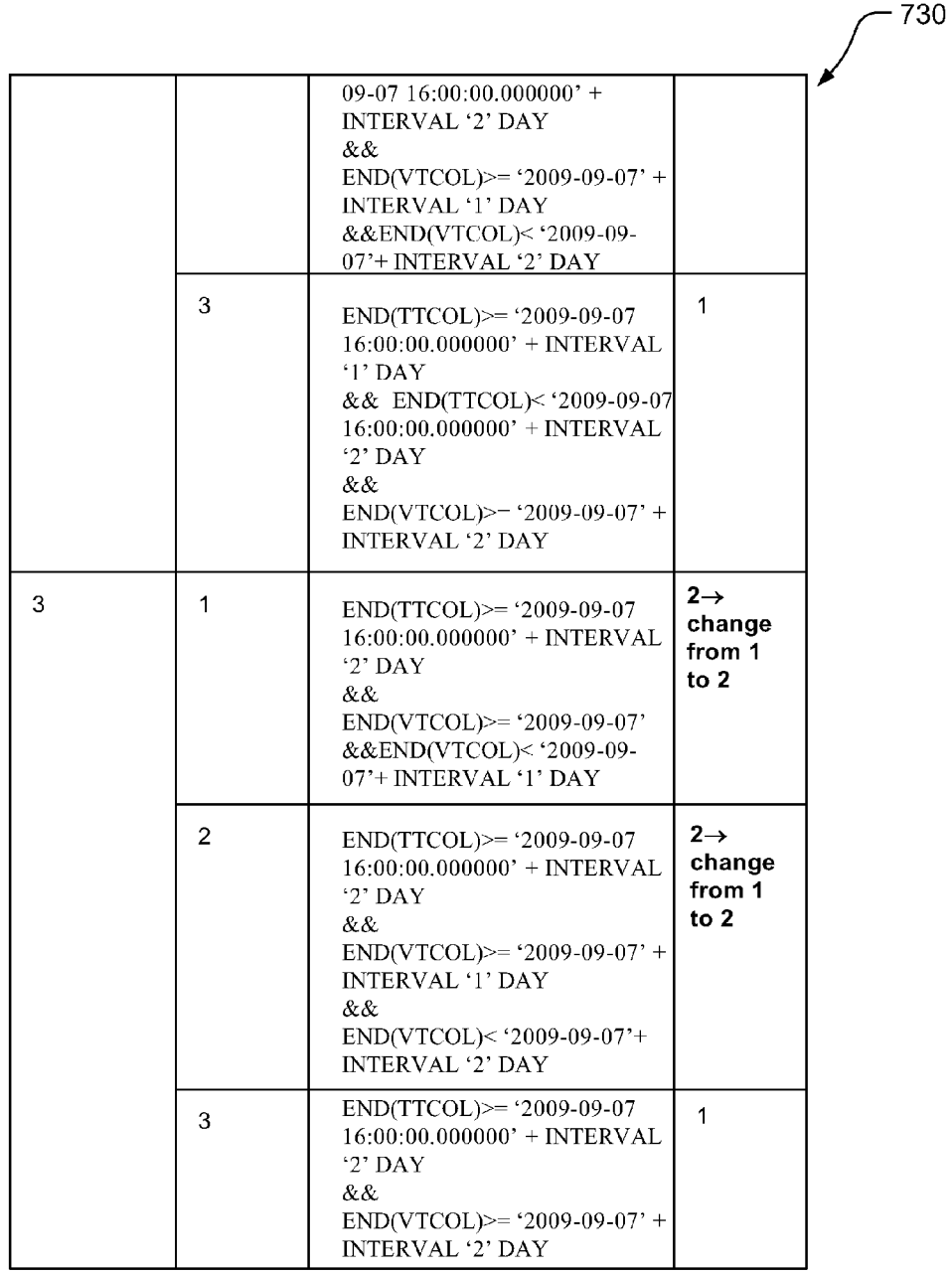

FIGS. 7A, 7B illustrate updated physical to logical partition mapping 730 for a bi-temporal table according to various embodiments of the invention. For example, if a lazy move request was issued on date 2009-09-09, at time 09:53:00.000000, only the virtual partitioning of the table would be changed. That is, the mapping of all the sub-partitions in partition 1 would be updated to logical partition 3. Similarly, the mapping of physical partition 2/sub-partition 1, physical partition 2/sub-partition 2, physical partition 3/sub-partition 1, and physical partition 3/sub-partition 2 would be updated to logical partition 2.

FIGS. 8A, 8B illustrate physical partition combination and updated physical to logical partition mapping 840 for a bi-temporal table according to various embodiments of the invention. In this case, when the maximum chosen partition number of the outer level is found to hold historical data, the corresponding sub-partitions of all the partitions (physical partition 1 and physical partition 2, and history data in physical partition 3) are combined, and logical partition 1 is assigned to the combined physical partition. Then logical partition 2 is assigned to the newly-created physical partition.

As a more concrete example, assume a lazy move request is issued on 2009-09-12 at time 16:00:00.000000. When it is determined that at least one sub-partition of the outer level partition having the highest assigned number contains closed rows, physical data movement is triggered.

In this case, the database system may operate to: (a) combine the corresponding sub-partitions of physical partition 1, partition 2, and history data (closed rows) in partition 3, (b) assign logical partition 1 to the combined physical partition, and (c) change the associated condition (in this case, the condition in the third column) to match the combined partition.

Next all the invalid open rows in partition 3 (including partition 3/sub-partition 1, partition 3/sub-partition 2 and invalid open rows in partition 3/sub-partition 3) will be rolled over to partition 3/sub-partition 1, and all the valid open rows, which should only be found in partition 3/sub-partition 3 will remain in partition 3/sub-partition3. The condition associated with all the sub-partitions in partition 3 will also be updated accordingly. The condition associated with all the sub-partitions in partition 3 will take into consideration the new partition 2, as described later.

Physical partition 3/sub-partition 1 is designed to cover the end of TransactionTime starting from CURRENT TIMESTAMP(2009-09-12 16:00:00.000000) plus one day and cover the end of ValidTime from the table creation time(2009-09-07) to CURRENT DATE(2009-09-12). Physical partition 3/sub-partition 2 is designed to cover the end of TransactionTime starting from CURRENT TIMESTAMP(2009-09-12 16:00:00.000000) plus one day and cover the end of ValidTime for one day duration starting from CURRENT DATE (2009-09-12). Physical partition 3/sub-partition 3 is designed to cover the end of TransactionTime starting from CURRENT TIMESTAMP(2009-09-12 16:00:00.000000) plus one day and cover the end of ValidTime starting from CURRENT DATE(2009-09-12) plus one day. The mapping of all the sub-partitions in physical partition 3 to a logical partition is updated when needed.

For the bi-temporal table shown, physical partition 1/sub-partition 1+physical partition 2/sub-partition 1+closed rows in physical partition 3/sub-partition 1→(are assigned to) new physical partition 1/sub-partition 1. In addition, physical partition 1/sub-partition 2+physical partition 2/sub-partition 2+closed rows in physical partition 3/sub-partition 2→(are assigned to) new physical partition 1/sub-partition 2. Finally, physical partition 1/sub-partition 3+physical partition 2/sub-partition 3+closed rows in physical partition 3/sub-partition 3→(are assigned to) new physical partition 1/sub-partition 3.

Next, the system may operate to create a new physical partition, which is assigned to logical partition 2. As part of this activity, the following may be involved.

The new partition 2, including all its sub-partitions, are created with the anticipation that after a day or two the database will generate some closed rows or invalid open rows that fall into the condition defined, The virtual partitioning will be updated when a lazy move request is received at that time.

Thus, physical partition 2/sub-partition 1→(is assigned to) END(TT) is between date 2009-09-12, time 16:00:00.000000 and ('2009-09-12 16:00:00.000000'+INTERVAL '1' DAY) and END(VT), between date 2009-09-07 and date 2009-09-12. Physical partition 2/sub-partition 1 is designed to cover the end of TransactionTime for one day duration starting from CURRENT TIMESTAMP(2009-09-12 16:00:00.000000) and cover the end of ValidTime from the table creation time(2009-09-07) to CURRENT DATE(2009-09-12). Physical partition 2/sub-partition2→(is assigned to) END(TT) is between date 2009-09-12, time 16:00:00.000000 and ('2009-09-12 16:00:00.000000'+INTERVAL '1' DAY) and END(VT), between date 2009-09-12 and ('2009-09-12'+INTERVAL '1' DAY). Physical partition 2/sub-partition 2 is designed to cover the end of TransactionTime for one day duration starting from CURRENT TIMESTAMP(2009-09-12 16:00:00.000000) and cover the end of ValidTime for one day duration starting from CURRENT DATE(2009-09-12). Physical partition 2/sub-partition 3→(is assigned to) END(TT) is between date 2009-09-12, time 16:00:00.000000 and ('2009-09-12 16:00:00.000000'+INTERVAL '1' DAY) and END(VT) is later than ('2009-09-12'+INTERVAL '1' DAY). Finally, physical partition 2/sub-partition 3 is designed to cover the end of TransactionTime for one day duration starting from CURRENT TIMESTAMP (2009-09-12 16:00:00.000000) and cover the end of ValidTime starting from CURRENT DATE(2009-09-12) plus one day.

The mapping for all the partitions can be updated according to the SQL statement CURRENT DATE/CURRENT TIMESTAMP(2009-09-12 16:00:00.000000). That is, the mapping from all the sub-partitions in physical partition 1 are updated to logical partition 3. Logical partition 2 is assigned to physical partition 2/sub-partition 1 and physical partition 3/sub-partition 1. Logical partition 1 is assigned to physical partition 2/sub-partition 2, physical partition 2/sub-partition 3 , physical partition 3/sub-partition 2, and physical partition 3/sub-partition 3. The revised virtual partitioning is shown in FIGS. 8A, 8B.

While a temporal database has been described in the various examples, the various embodiments are not to be so limited. Rather, many embodiments include creating physical partitions with revised virtual N-to-M partitioning, where N physical partitions are mapped to M logical partitions, and where M<N. Thus, in response to receiving a request to move part of a database table from a current partition to a history partition, the physical partitioning of the table is simply remapped to the logical partitioning of the table. The data itself is not moved in most cases. In this way, physical data movement is greatly reduced by revising the virtual partition arrangement.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

Figure 9:
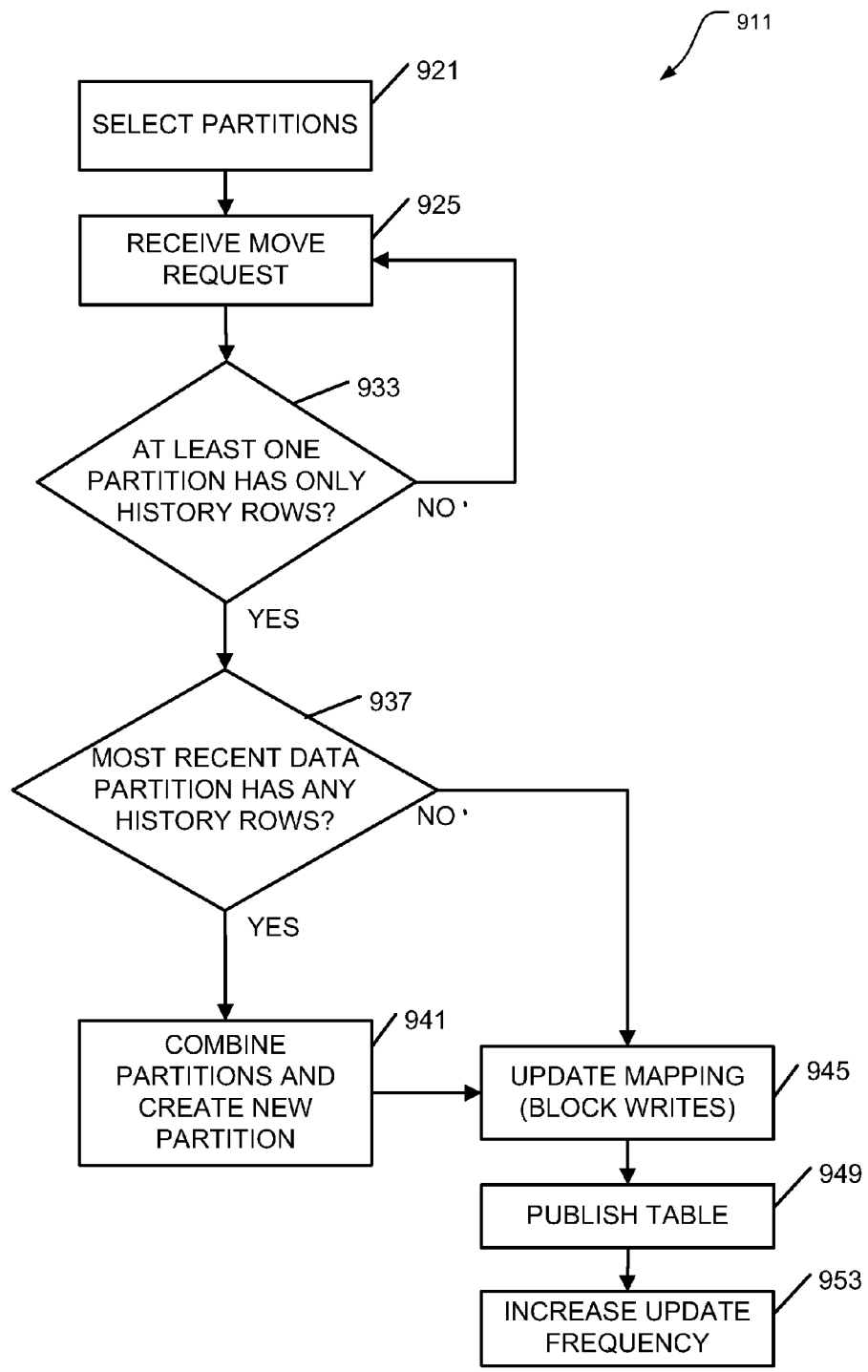
FIG. 9 is a flow diagram illustrating several methods of database partition management according to various embodiments of the invention.

FIG. 9 is a flow diagram illustrating several methods 911 of database partition management according to various embodiments of the invention. The methods 911 are implemented in a machine-accessible and readable medium, and are operational over processes within and among networks. The networks may be wired, wireless, or a combination of wired and wireless. The methods 911 may be implemented as instructions, which when accessed by a specific machine, perform the processing depicted in FIG. 9.

In some embodiments, the method 911 may comprise a processor-implemented method to execute on one or more processors that perform the method. The method 911 may begin at block 921 with selecting the number of physical partitions that will be used.

As noted previously, the number of physical partitions may be selected based on the expected lifetime of the table, divided by the frequency of lazy move requests. Thus, the activity at block 921 may comprise selecting the number of physical partitions to be approximately equal to an expected lifetime of content in the table divided by an expected frequency of the lazy move request. This is one way in which the database table may be partitioned into physical partitions according to a selected mapping update frequency.

The method 911 may continue on to block 925 to include receiving a request to move at least a portion of a database table stored on a tangible medium from a current partition to a history partition. SQL statements can be used to generate a lazy move request. Thus, the activity at block 925 may comprise receiving an "ALTER TABLE" SQL statement.

Mapping may be updated when all of the data stored in a physical partition becomes history data. Thus, the method 911 may continue on to block 933 to include refraining from updating the mapping of at least one of the physical partitions until all data stored in the at least one of the physical partitions comprises only history rows. If no partition has only history rows, the method 911 may return to block 925.

Physical partitions can be combined, and created. Thereafter, logical partitions can be mapped to a group of physical partitions that include both partitions that have been combined, and those that have been created.

Thus, the method 911 may continue on to block 937 with determining whether the physical partition with the highest assigned number (e.g., the physical partition assigned to receive the most recent data) has any history rows. If it is a multi-level physical partition model, the determination can be made based on whether the physical partition of the outer level having the highest assigned number (e.g., the outer level physical partition assigned to receive the most recent data) contains any history rows. Thus, the method 911 may also include, at block 937, refraining from creating a new one of the physical partitions until one of the physical partitions assigned to receive the most recent data comprises at least one history row.

If not, then the method 911 may continue on to block 945. If so, then the method 911 may continue on to block 941 to include combining at least some of the physical partitions into a combined physical partition after all but one of the physical partitions have been moved to the history partition, and creating at least one new physical partition. The method 911 may then continue on to block 945.

At block 945, the method 911 may comprise modifying a logical partitioning of the database table by updating a mapping of the physical partitions to logical partitions, in response to receiving the lazy move request. If partitions have been combined and created at block 941, then the activity at block 945 may comprise mapping the logical partitions to the combined physical partition and at least one new physical partition.

As part of the activity at block 945, some of the logical partitions may be designated as the current partition, and some of the history partition. Thus, the current partition and the history partition may comprise some of the logical partitions.

When re-mapping of the physical partitions to logical partitions occurs, read operations are permitted, but usually not write operations. Thus, the activity at block 945 may comprise permitting read operations and blocking write operations during the modification of the logical partitions.

Some part of the table that is moved can be shown to the user on a display. Thus, the method 911 may continue on to block 949 with publishing some portion of the database table to a display screen.

The mapping update frequency is how often the logical-to-physical partition mapping is changed/updated. Increasing the mapping update frequency should generally decrease the amount of history data stored in the current partition over time. Thus, the method 911 may continue on to block 953 to include reducing the percentage of history data stored in the current partition by increasing the mapping update frequency.

It should be noted that the upper effective limit of the mapping update frequency is the partitioning time interval. Thus, assuming that each physical partition covers the duration of one day, for example, updating the mapping more than once per day wouldn't decrease the amount of history in the partition. Additional embodiments may be realized.

Figure 10:
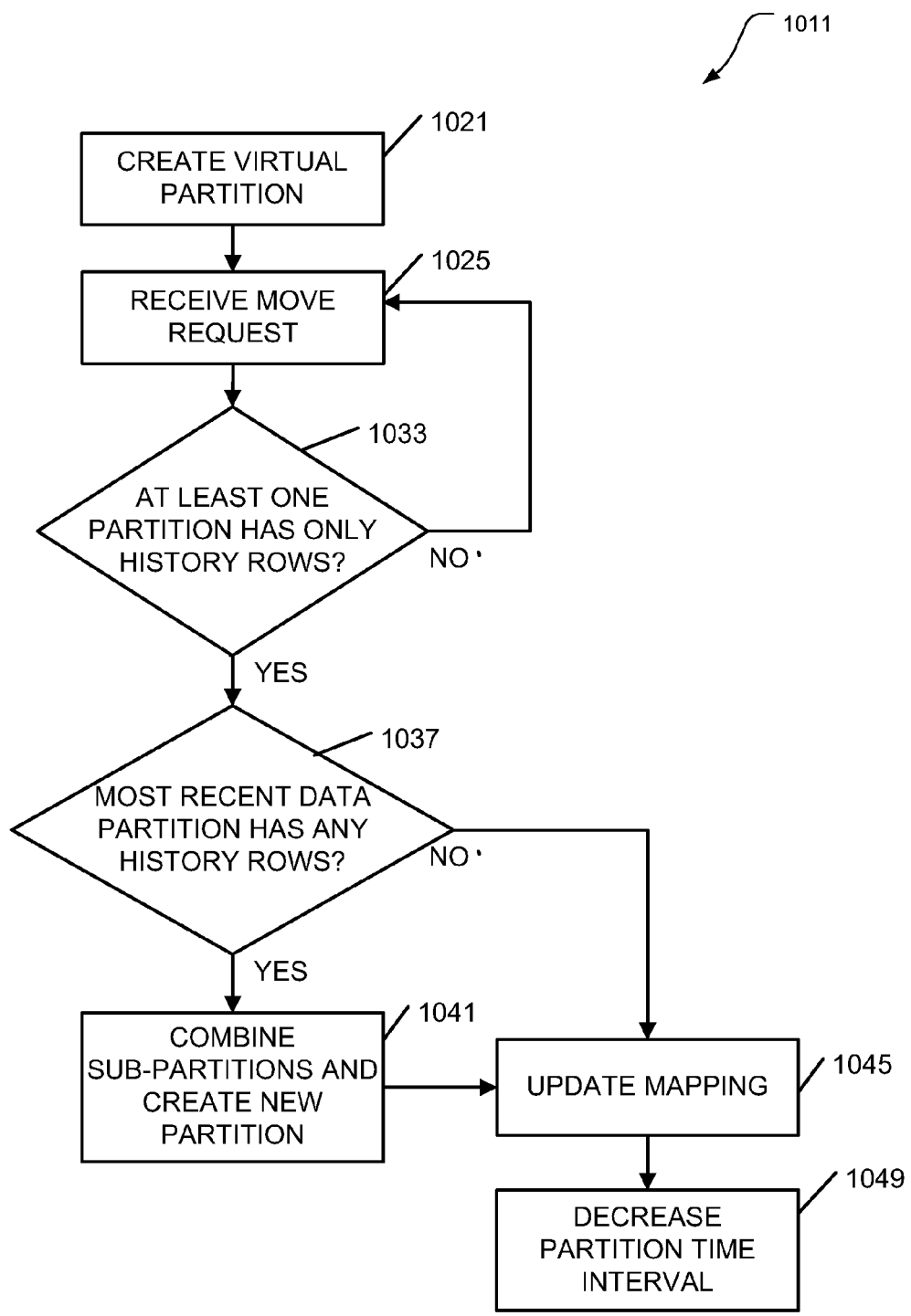
FIG. 10 is a flow diagram illustrating additional methods of database partition management according to various embodiments of the invention.

For example, FIG. 10 is a flow diagram illustrating additional methods 1011 of database partition management according to various embodiments of the invention. For example, a table may be created to store data related to particular time periods, so that the data is not moved when a lazy move request is received.

Thus, a method 1011 may begin at block 1021 with creating a virtual partition of a temporal database table including data associated with valid times and transaction times, by mapping physical partitions of the table to logical partitions of the table, wherein the physical partitions are associated with a selected mapping update frequency.

The table may comprise a bi-temporal table. Multi-level physical partitions associated with the table can be organized according to time periods. Thus, the physical partitions may comprise an outer level and an inner level, such that transaction times are associated with a first one of the inner level or the outer level, and valid times are associated with a second one of the inner level or the outer level, using a multi-level PPI.

The method 1011 may continue on to block 1025 with receiving a lazy move request to move at least a portion of the data from a current partition to a history partition. If at least one partition has only history rows, as determined at block 1033, the method may continue on to block 1037. Otherwise, the method 1011 may return to block 1025.

At block 1037, a determination is made as to whether the physical partition having the highest assigned number (e.g., the physical partition assigned to receive the most recent data) has any history rows. If it is a multi-level physical partition model, the determination can be made based on whether the physical partition of the outer level having the highest assigned number (e.g., the outer level physical partition assigned to receive the most recent data) has any history rows. If this is not the case, then the method 1011 may go on to update the mapping of the table at block 1045. Otherwise, the method 1011 may continue on to block 1041.

Multi-level physical partitions can be treated as sub-partitions, which are combined and re-mapped to the logical partitions. Thus, the method 1011 may include, at block 1041, combining at least some sub-partitions of the physical partitions into a combined physical partition, and creating at least one new physical partition.

The method 1011 may continue on to block 1045 to include modifying the logical partitions by updating the mapping, instead of moving the data, in response to receiving the lazy move request. If the method 1011 operates to combine physical partitions and create new physical partitions, then the activity at block 1045 may include mapping the logical partitions to the combined physical partition and the at least one new physical partition. In this case, the data is usually moved.

The number of physical partitions can be greater than the number of logical partitions. For example, the number of the physical partitions N may be greater than the number of logical partitions M, as noted previously.

The partitioning time interval is the time granularity that is associated with the physical partitions. The smaller the time interval associated with each physical partition, the less history data, on average, will be stored in each physical partition.

A multiple of the partitioning interval and the number of physical partitions is proportionate to how often the physical partitions are combined. Thus, the method 1011 may continue on to block 1049 with reducing a percentage of history data stored in the current partition by decreasing a partitioning time interval.

The methods described herein do not have to be executed in the order described, or in any particular order. Moreover, various activities described with respect to the methods identified herein can be executed in repetitive, serial, or parallel fashion. The individual activities of the methods shown in FIGS. 9 and 10 can also be combined with each other and/or substituted, one for another, in various ways. Information, including parameters, commands, operands, and other data, can be sent and received in the form of one or more carrier waves. Thus, many other embodiments may be realized.

The methods shown in FIGS. 9 and 10 can be implemented in various devices, as well as in a computer-readable storage medium, where the methods are adapted to be executed by one or more processors. Further details of such embodiments will now be described.

Figure 11:
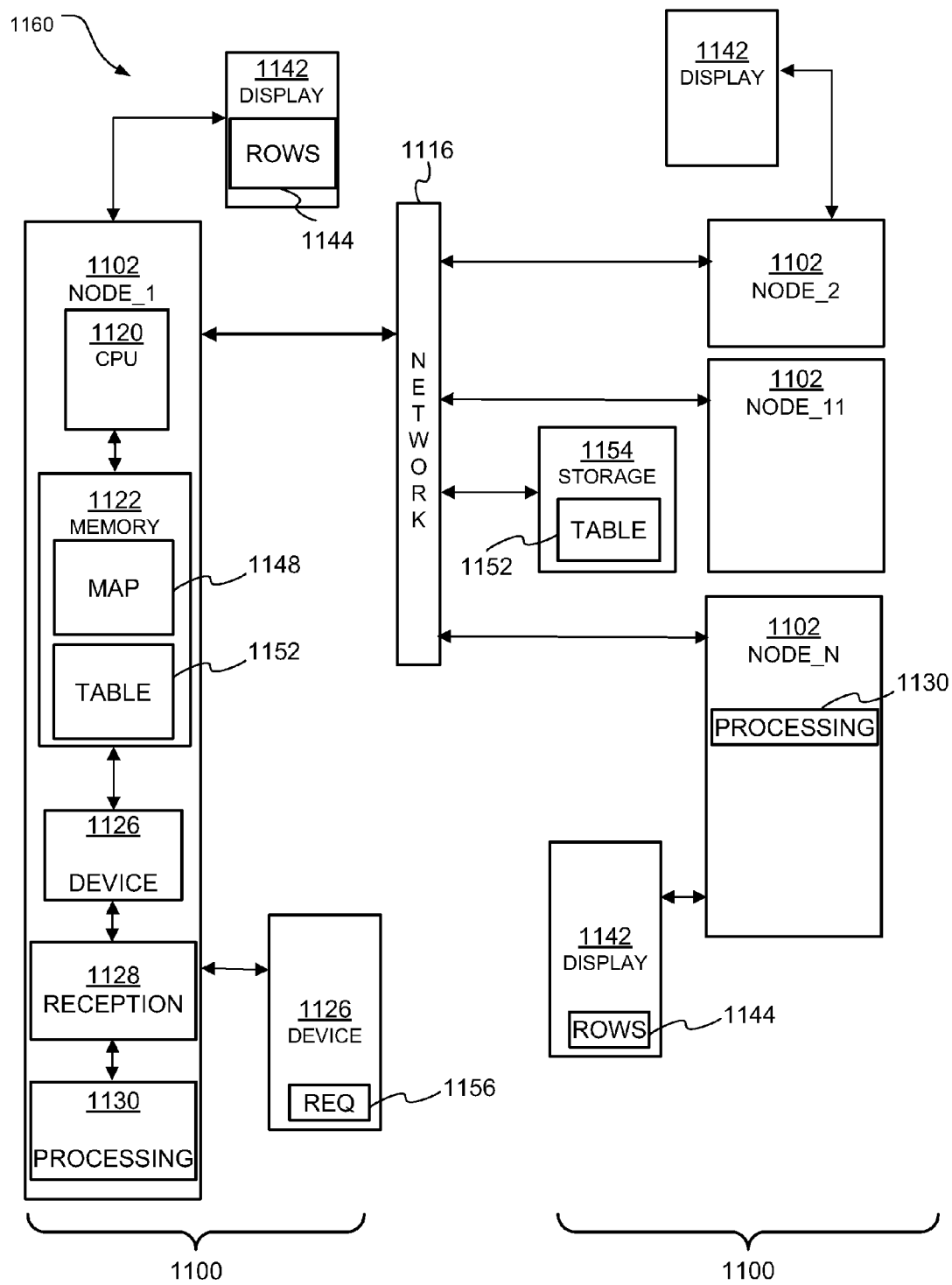
FIG. 11 is a block diagram of apparatus and systems according to various embodiments of the invention.

FIG. 11 is a block diagram of apparatus 1100 and systems 1160 according to various embodiments of the invention. Here it can be seen that an apparatus 1100 used to implement database partition management may comprise one or more processing nodes 1102, one or more processors 1120, memories 1122, one or more user input devices 1126, a data reception module 1128, a processing module 1130, and one or more displays 1142. The apparatus 1100 may comprise a client, a server, or a networked processing node.

The processing nodes 1102 may in turn comprise physical machines or virtual machines, or a mixture of both. The nodes 1102 may also comprise networked entities, such servers and/or clients. In some cases, the operations described herein can occur entirely within a single node 1102.

In some embodiments then, an apparatus 1100 may comprise a data reception module 1128 to receive the lazy move request, and a processing module 1130 to update the virtual mapping of the partitions in a table. Thus, an apparatus 1100 may comprise a reception module 1128 to receive a request 1156 to move at least a portion of a database table 1152 stored on a tangible medium from a current partition to a history partition. The database table 1152 may be partitioned into physical partitions of the tangible medium according to a selected mapping update frequency.

The apparatus 1100 may further comprise a processing module 1130 to modify a logical partitioning of the database table 1152 by updating a mapping of the physical partitions to logical partitions. The map 1148 which is used to record the mapping of the table 1152 may be stored in a memory 1122.

The data in the table may be made visible to humans, using a display. Thus, the apparatus 1100 may comprise one or more displays 1142 to display some rows 1144 of the database table 1152.

The data may be stored at a remote node, rather than locally. Thus, the apparatus 1100 may comprise a storage node 1154 that includes the tangible medium on which the database is stored.

Operations can be divided up into multiple nodes. Thus, the apparatus 110 may comprise a first node (e.g., NODE_1) to house the reception module 1128, and a second node (e.g., NODE_N) to house the processing module 1130.

A data base administrator may operate a user input device to generate the lazy move request. Thus, the apparatus 1100 may comprise one or more user input devices 1126 to transmit the request 1156.

Still further embodiments may be realized. For example, it can be seen that a system 1160 that operates to implement database partition management may comprise multiple instances of the apparatus 1100. The system 1160 might also comprise a cluster of nodes 1102, including physical and virtual nodes. It should be noted that any of the nodes 1102 may include any one or more of the elements explicitly shown in nodes NODE_1, NODE_2, NODE_3, . . . NODE_N.

The apparatus 1100 and systems 1160 may be implemented in a machine-accessible and readable medium that is operational over one or more networks 1116. The networks 1116 may be wired, wireless, or a combination of wired and wireless. The apparatus 1100 and system 1160 can be used to implement, among other things, the processing associated with the methods 911 and 1011 of FIGS. 9 and 10, respectively. Modules may comprise hardware, software, and firmware, or any combination of these. Additional embodiments may be realized.

Figure 12:
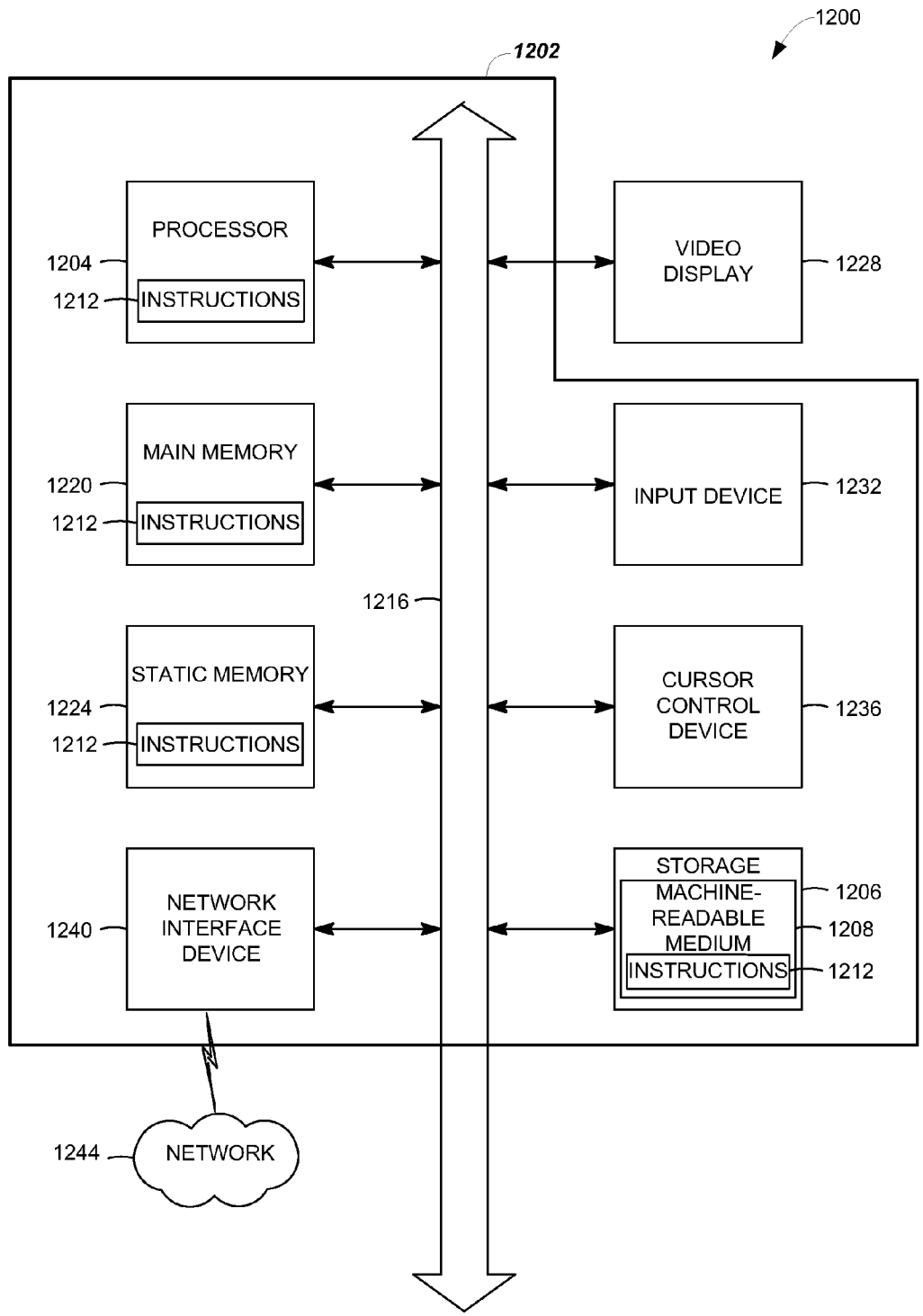
FIG. 12 is a block diagram of an article of manufacture, including a specific machine, according to various embodiments of the invention.

For example, FIG. 12 is a block diagram of an article 1200 of manufacture, including a specific machine 1202, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-oriented format using an object-oriented language such as Java or C++. Alternatively, the programs can be structured in a procedure-oriented format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 1200 of manufacture, such as a computer, a memory system, a magnetic or optical disk, some other storage device, and/or any type of electronic device or system may include one or more processors 1204 coupled to a machine-readable medium 1208 such as a memory (e.g., removable storage media, as well as any memory including an electrical, optical, or electromagnetic conductor) having instructions 1212 stored thereon (e.g., computer program instructions), which when executed by the one or more processors 1204 result in the machine 1202 performing any of the actions described with respect to the methods above.

The machine 1202 may take the form of a specific computer system having a processor 1204 coupled to a number of components directly, and/or using a bus 1216. Thus, the machine 1202 may be similar to or identical to the apparatus 1100 or system 1160 shown in FIG. 11.

Turning now to FIG. 12, it can be seen that the components of the machine 1202 may include main memory 1220, static or non-volatile memory 1224, and mass storage 1206. Other components coupled to the processor 1204 may include an input device 1232, such as a keyboard, or a cursor control device 1236, such as a mouse. An output device 1228, such as a video display, may be located apart from the machine 1202 (as shown), or made as an integral part of the machine 1202.

A network interface device 1240 to couple the processor 1204 and other components to a network 1244 may also be coupled to the bus 1216. The instructions 1212 may be transmitted or received over the network 1244 via the network interface device 1240 utilizing any one of a number of well-known transfer protocols (e.g., HyperText Transfer Protocol). Any of these elements coupled to the bus 1216 may be absent, present singly, or present in plural numbers, depending on the specific embodiment to be realized.

The processor 1204, the memories 1220, 1224, and the storage device 1206 may each include instructions 1212 which, when executed, cause the machine 1202 to perform any one or more of the methods described herein. In some embodiments, the machine 1202 operates as a standalone device or may be connected (e.g., networked) to other machines. In a networked environment, the machine 1202 may operate in the capacity of a server or a client machine in server-client network environment, or as a peer machine in a peer-to-peer (or distributed) network environment.

The machine 1202 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 1202 is illustrated, the term "machine" shall also be taken to include any collection of machines that individually or jointly execute a set (or multiple sets) of instructions to perform any one or more of the methodologies discussed herein.

While the machine-readable medium 1208 is shown as a single medium, the term "machine-readable medium" should be taken to include a single medium or multiple media (e.g., a centralized or distributed database, and/or associated caches and servers, and or a variety of storage media, such as the registers of the processor 1204, memories 1220, 1224, and the storage device 1206 that store the one or more sets of instructions 1212). The term "machine-readable medium" shall also be taken to include any medium that is capable of storing, encoding or carrying a set of instructions for execution by the machine and that cause the machine 1202 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to dramatically reduce the I/O operational cost of lazy move operations, and thus, improve query performance. As a result, database administrators might be motivated to initiate lazy move operations more often, with additional gains in performance. Increased efficiency and user satisfaction may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A processor-implemented method to execute on one or more processors that perform the method, comprising:
    creating a virtual partition of a temporal database table by mapping physical partitions of the table to logical partitions of the table, wherein the temporal database includes data associated with valid times and transaction times, wherein valid times are rows that are either valid or no longer valid, wherein a valid row references a time that is current or future to a present time and a no longer valid row references a time that is past, wherein transaction times are rows that are either an open transaction or a closed transaction, wherein a first portion of the logical partitions belong to a current partition and a second portion of the logical partitions belong to a history partition, wherein the physical partitions are associated with a selected mapping update frequency for a partition mapping update, the partition mapping update changing the mapping of a physical partition from a logical current partition to a logical history partition;
    receiving a request to move at least a portion of the data from the current partition to the history partition, the at least a portion of the data being at least one of valid times data that is no longer valid or transaction times data that is closed; and
    in response to the receiving, modifying the logical partitions by updating the mapping of the physical partitions from a logical current partition to a logical history partition, instead of moving the data to other physical partitions.

2. A machine-readable medium that is not a transitory propagating signal, the machine-readable medium including instructions that, when executed by a machine, cause the machine to perform operations comprising:
    creating a virtual partition of a temporal database table by mapping physical partitions of the table to logical partitions of the table, wherein the temporal database includes data associated with valid times and transaction times, wherein valid times are rows that are either valid or no longer valid, wherein a valid row references a time that is current or future to a present time and a no longer valid row references a time that is past, wherein transaction times are rows that are either an open transaction or a closed transaction, wherein a first portion of the logical partitions belong to a current partition and a second portion of the logical partitions belong to a history partition, wherein the physical partitions are associated with a selected mapping update frequency for a partition mapping update, the partition mapping update changing the mapping of a physical partition from a logical current partition to a logical history partition;

receiving a request to move at least a portion of the data from the current partition to the history partition, the at least a portion of the data being at least one of valid times data that is no longer valid or transaction times data that is closed; and in response to the receiving, modifying the logical partitions by updating the mapping of the physical partitions from a logical current partition to a logical history partition, instead of moving the data.

3. An apparatus, comprising:

a processing module to:

create a virtual partition of a temporal database table by mapping physical partitions of the table to logical partitions of the table, wherein the temporal database includes data associated with valid times and transaction times, wherein valid times are rows that are either valid or no longer valid, wherein a valid row references a time that is current or future to a present time and a no longer valid row references a time that is past, wherein transaction times are rows that are either an open transaction or a closed transaction, wherein a first portion of the logical partitions belong to a current partition and a second portion of the logical partitions belong to a history partition, wherein the physical partitions are associated with a selected mapping update frequency for a partition mapping update, the partition mapping update changing the mapping of a physical partition from a logical current partition to a logical history partition; and modify the logical partitions, in response to a request to move at least a portion of the data from the current partition to the history partition, by updating the mapping of the physical partitions from a logical current partition to a logical history partition, instead of moving the data; and a reception module to receive the request to move at least a portion of a the data from a current partition to a history partition, the at least a portion of the data being at least one of valid times data that is no longer valid or transaction times data that is closed.

4. The method of claim 1, wherein a number of the physical partitions N is greater than the number of logical partitions M.

5. The method of claim 1, further comprising:

reducing a percentage of history data stored in the current partition by decreasing a partitioning time interval.

6. The method of claim 1, wherein the table comprises a bi-temporal table.

7. The method of claim 1, wherein the physical partitions comprise an outer level and an inner level, with the transaction times associated with a first one of the inner level or the outer level, and the valid times associated with a second one of the inner level or the outer level, using a multi-level primary partition index.

8. The method of claim 1, further comprising:

combining at least some sub-partitions of the physical partitions into a combined physical partition;

creating at least one new physical partition; and mapping the logical partitions to the combined physical partition and the at least one new physical partition.

9. The machine-readable medium of claim 2, wherein a number of the physical partitions N is greater than the number of logical partitions M.

10. The machine-readable medium of claim 2, further including instructions that, when executed, cause the machine to perform operations comprising:

reducing a percentage of history data stored in the current partition by decreasing a partitioning time interval.

11. The machine-readable medium of claim 2, wherein the table comprises a bi-temporal table.

12. The machine-readable medium of claim 2, wherein the physical partitions comprise an outer level and an inner level, with the transaction times associated with a first one of the inner level or the outer level, and the valid times associated with a second one of the inner level or the outer level, using a multi-level primary partition index.

13. The machine-readable medium of claim 2, further including instructions that, when executed, cause the machine to perform operations comprising:

combining at least some sub-partitions of the physical partitions into a combined physical partition;

creating at least one new physical partition; and mapping the logical partitions to the combined physical partition and the at least one new physical partition.

14. The apparatus of claim 3, wherein a number of the physical partitions N is greater than the number of logical partitions M.

15. The apparatus of claim 3, wherein the processing module is to reduce a percentage of history data stored in the current partition by decreasing a partitioning time interval.

16. The apparatus of claim 3, wherein the table comprises a bi-temporal table.

17. The apparatus of claim 3, wherein the physical partitions comprise an outer level and an inner level, with the transaction times associated with a first one of the inner level or the outer level, and the valid times associated with a second one of the inner level or the outer level, using a multi-level primary partition index.

18. The apparatus of claim 3, wherein the processing module is to:

combine at least some sub-partitions of the physical partitions into a combined physical partition;

create at least one new physical partition; and map the logical partitions to the combined physical partition and the at least one new physical partition.

19. The apparatus of claim 3, further comprising:

a storage node that includes the tangible medium.

20. The apparatus of claim 3, further comprising:

a first node to house the reception module; and a second node to house the processing module.

* * * * *